United States Patent
Saito

(10) Patent No.: US 9,025,070 B2
(45) Date of Patent: May 5, 2015

(54) IMAGE CAPTURE APPARATUS AND CONTROL METHOD OF IMAGE CAPTURE APPARATUS

(71) Applicant: Olympus Imaging Corp., Shibuya-ku, Tokyo (JP)

(72) Inventor: Keisuke Saito, Fussa (JP)

(73) Assignee: Olympus Imaging Corp., Tokyo (JP)

( * ) Notice: Subject to any disclaimer, the term of this patent is extended or adjusted under 35 U.S.C. 154(b) by 165 days.

(21) Appl. No.: 13/744,609

(22) Filed: Jan. 18, 2013

(65) Prior Publication Data
US 2013/0188090 A1   Jul. 25, 2013

(30) Foreign Application Priority Data
Jan. 20, 2012   (JP) ................................ 2012-010307

(51) Int. Cl.
H04N 5/232 (2006.01)
(52) U.S. Cl.
CPC ................................. *H04N 5/23212* (2013.01)
(58) Field of Classification Search
USPC .................................................. 348/346, 352
See application file for complete search history.

(56) References Cited

U.S. PATENT DOCUMENTS

| | | | | |
|---|---|---|---|---|
| 2003/0095192 | A1* | 5/2003 | Horiuchi | 348/222.1 |
| 2007/0115385 | A1* | 5/2007 | Nonaka | 348/349 |
| 2008/0024619 | A1* | 1/2008 | Ono | 348/222.1 |
| 2010/0141826 | A1* | 6/2010 | Thorn | 348/345 |
| 2011/0249150 | A1* | 10/2011 | Shintani et al. | 348/240.3 |
| 2012/0147245 | A1* | 6/2012 | Iijima et al. | 348/333.11 |
| 2013/0293759 | A1* | 11/2013 | Lee et al. | 348/333.11 |

FOREIGN PATENT DOCUMENTS

| | | |
|---|---|---|
| JP | 2006-287346 | 10/2006 |
| JP | 2009-081786 | 4/2009 |
| JP | 2009-100371 | 5/2009 |
| JP | 2010-085530 | 4/2010 |
| JP | 2011-101345 | 5/2011 |

* cited by examiner

*Primary Examiner* — Jason Flohre
(74) *Attorney, Agent, or Firm* — John C. Pokotylo; Straub & Pokotylo

(57) ABSTRACT

In an image capture apparatus, when a first object and a second object are designated via a touch operation unit during live view display, focus information of each of the first and second objects is stored, and then a focus moving time is set. In execution of image capture, image capture where a focusing point and an exposure value are adjusted to the first object is executed and, after an interval corresponding to the focus moving time, image capture where the focusing point and the exposure value are adjusted to the second object is executed.

6 Claims, 6 Drawing Sheets

IMAGE CAPTURE APPARATUS AND CONTROL METHOD OF IMAGE CAPTURE APPARATUS

Benefit is claimed under 35 U.S.C. §119, to the filing date of prior Japanese Patent Application No. 2012-010307 filed on Jan. 20, 2012. This application is expressly incorporated herein by reference. The scope of the present invention is not limited to any requirements of the specific embodiments described in the application.

BACKGROUND OF THE INVENTION

Field of the Invention

The present invention relates to an image capture (also referred to as "image taking") apparatus that takes images of objects existing at a plurality of different positions in an image capture screen.

SUMMARY OF THE INVENTION

An image capture apparatus according to the present invention comprises: an imaging unit for obtaining image data by imaging an object; a display unit for displaying an image corresponding to the image data; an object specifying unit for designating each of a first object and a second object in the image displayed by the display unit; a time setting unit for setting an image capture interval between the first object and the second object; and an imaging control unit for controlling the imaging unit to: after the setting, execute first imaging where the first object is a main object; and, after the image capture interval from the first imaging, execute second imaging where the second object is the main object.

DESCRIPTION OF THE PREFERRED EMBODIMENTS

The following describes embodiments of the present invention with reference to drawings.

First Embodiment

The following describes a first embodiment in which the present invention is applied to an interchangeable lens digital camera, with reference to drawings.

Figure 1:
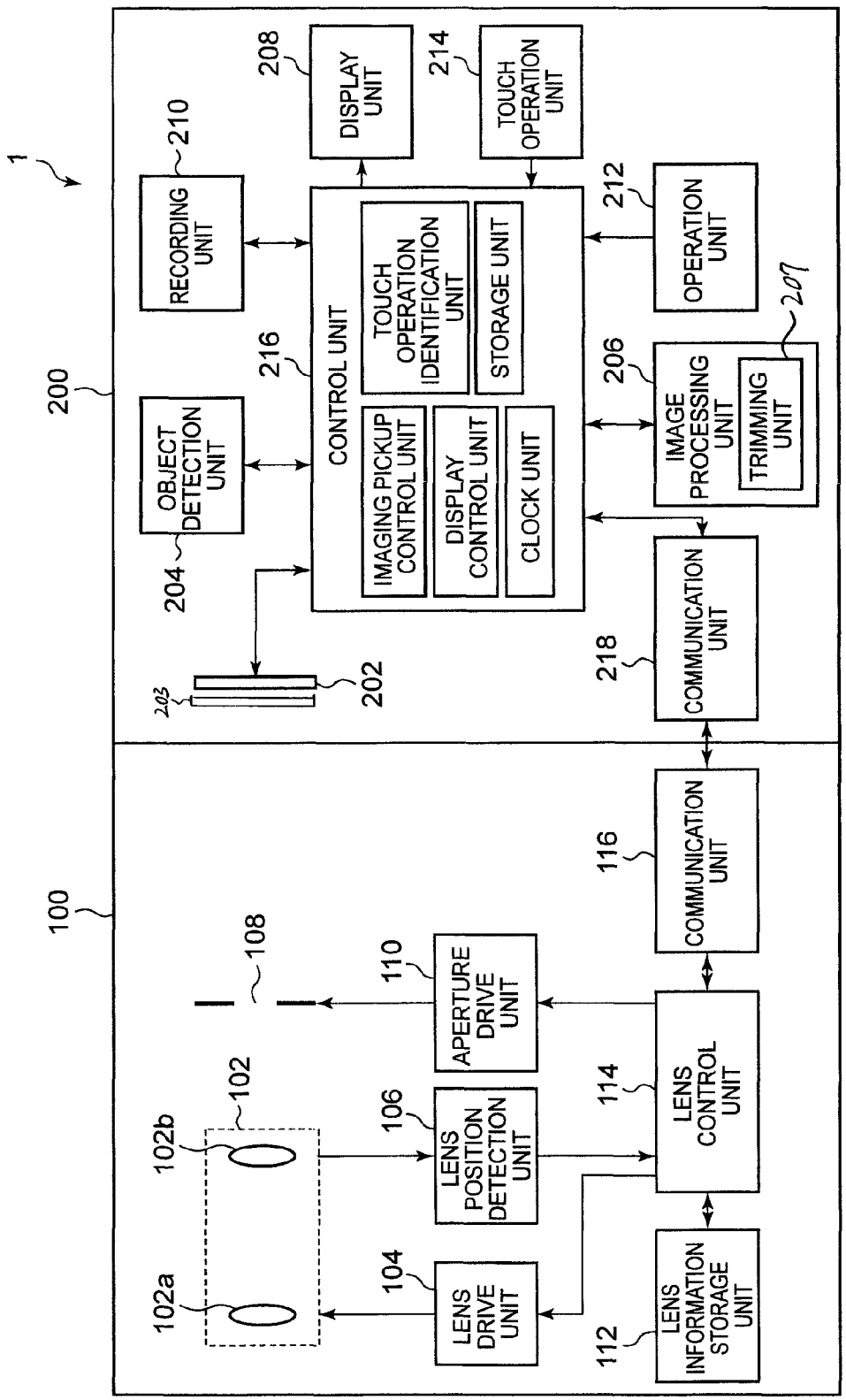
FIG. 1 is a diagram showing a structure of an image capture apparatus that may be used to support various example embodiments of the present invention.

FIG. 1 is a diagram showing a structure of an image capture apparatus that may be used to support various example embodiments of the present invention. FIG. 1 shows an example of a structure in the case where the image capture apparatus that may be used to support various example embodiments of the present invention is applied to an interchangeable lens digital camera. In this case, an image capture apparatus 1 includes an interchangeable lens 100 and a body 200. However, the image capture apparatus 1 need not be an interchangeable lens type apparatus.

The interchangeable lens 100 includes a taking lens 102, a lens drive unit 104, a lens position detection unit 106, an aperture 108, an aperture drive unit 110, a lens information storage unit 112, a lens control unit 114, and a communication unit 116.

The taking lens 102 may include a lens group including a plurality of lens elements such as, for example, a focusing lens 102a and a zoom lens 102b. The taking lens 102 directs light from an object (not shown) onto an image pickup device included in the image pickup 202, which is included in the body 200. The focusing lens 102a is a lens for focusing the taking lens 102, and the zoom lens 102b is a lens for adjusting an angle of view of the taking lens 102.

The lens drive unit 104 drives the focusing lens 102a and/or the zoom lens 102b in the taking lens 102, in accordance with control information provided by the lens control unit 114. The lens drive unit 104 may include motors (not shown) for driving the lens elements included in the taking lens 102, and a drive circuit (not shown) for driving these motors. The lens position detection unit 106 detects drive positions of the focusing lens 102a and/or the zoom lens 102b. The lens position detection unit 106 is, for example, composed of an encoder.

The aperture 108 can be opened and closed, and adjusts the amount of light imaged on the image pickup device via the taking lens 102 by adjusting the size of the opening. An out of focus condition of the image of the object formed on the image pickup device is adjusted by an aperture stop of the aperture 108 (that is, a size of the opening of the aperture).

The lens information storage unit 112 stores properties of the taking lens 102 such as focal length, F number, and aberration information. The lens information storage unit 112 in this embodiment may also store AF (auto focus) speed information. The AF speed information indicates a maximum drive extent to which the focusing lens 102a can be driven per unit time, and is determined by factors such as properties of the lens drive unit 104.

When the interchangeable lens 100 is provided on the body 200, the lens control unit 114 is connected so as to be communicable with a control unit 216 in the body 200 via the communication unit 116 of the interchangeable lens 100 and the communication unit 118 of the body 200. The lens control unit 114 controls the lens drive unit 104 and the aperture drive unit 110 in accordance with control information provided by the control unit 216. The lens control unit 114 also transmits the position of the focusing lens 102a detected by the lens position detection unit 106 and the lens information stored in the lens information storage unit 112 to the body 200 via the communication unit 116, during an AF operation and the like.

The communication unit 116 is an interface included in the interchangeable lens 100 for communicating various data between the lens control unit 114 and the control unit 216.

The body 200 includes a shutter 203, an imaging unit 202, an object detection unit 204, an image processing unit 206, a display unit 208, a recording unit 210, an operation unit 212, a touch operation unit 214, the control unit 216, and a communication unit 218.

The imaging unit 202 includes the image pickup device, an A/D (analog to digital) conversion circuit, and the like (not shown). The image pickup device constitutes a light receiving surface on which photoelectric converters are arranged two-dimensionally. Each photoelectric converter converts light from the image of the object formed via the taking lens 102 to an electrical signal. The imaging operation of the image pickup device is controlled by the control unit 216, which functions as an imaging control unit. The A/D conversion circuit converts the electrical signal obtained by the image pickup device, to a digital signal representing the image data.

The object detection unit 204 detects the object from the image data. For example, the object detection unit 204 detects, from the image data, an object corresponding to a "position in a display screen" selected via the touch operation unit 214. The object detection may be performed, for example, by contour detection or by detection of an area having similar luminance or color to the selected position. Alternatively, the object detection may be executed by other various known methods. The object detection unit 204 also functions as a motion detection unit. The object detection unit 204 detects object motion by detecting the motion or movement of the object over a plurality of pieces of image data at different times.

The image processing unit 206 performs image processing on the digital image data. The image processing performed by the image processing unit 206 may include various processing (e.g. white balance correction, γ correction (gamma correction), etc.) desired for displaying an image corresponding to the image data by the display unit 208 or for recording an image file corresponding to the image data, coding processing of the image data, decoding processing of the coded image data, and so on. Moreover, the image processing unit 206 includes a trimming unit 207. The trimming unit trims an area surrounding a designated object from the image data.

The display unit 208 displays various images such as images based on the digital image data processed by the image processing unit 206. The display unit 208 is, for example, composed of a liquid crystal display.

The recording unit 210 records the image file generated from the digital image data processed by the image processing unit 206. The recording unit 210 is, for example, composed of a memory card removable from the body 200. Alternatively, the recording unit 210 may be built into the body 200.

The operation unit 212 is, for example, composed of a plurality of operation members (e.g., buttons, dials, switches, etc.) for the user to perform various operations on the image capture apparatus 1. The operation members include, for example, a shutter release button, a mode dial, a power button, and so on. The shutter release button is an operation member for the user to instruct the body 200 to start image capture and/or to perform pre image capture operations such as AF and AE. The mode dial is an operation member for the user to instruct the body 200 to set an operation mode. The power button is an operation member for the user to instruct the body 200 to be powered on or off.

The touch operation unit 214 is formed on the display screen of the display unit 208, for example. The touch operation unit 214 is, for example, a touch operation unit according to a capacitance method and, in the case where the user's finger or the like touches the touch operation unit 214, detects the position of the touch. The touch operation unit 214 thus detects the touch operation by the user. The touch operation unit 214 also functions as an example of an object specifying unit and a time setting unit.

The control unit 216 controls the operation of each unit, as well as the image pickup 202, of the body 200, and may indirectly control various units of the interchangeable lens 100. For example, the control unit 216 may control the lens control unit 114, to thereby control the AF operation of the taking lens 102. Various AF methods such as a known contrast detection AF method and phase difference detection AF method may be used for AF. The control unit 216 also controls the imaging operation of the imaging unit 202. The control unit 216 also controls the display operation of the display unit 208. The control unit 216 further generates the image file from the digital image data and records the generated image file in the recording unit 210. In addition, the control unit 216 functions as a touch operation identification unit and, if the user operates the touch operation unit 214, unit 216 identifies the operation. Moreover, the control unit 216 may include a storage unit, and temporarily holds various information such as focus information. The control unit 216 may also include a clock unit, and can measure various times such as a focus moving time described later.

The communication unit 218 is an interface included in the body 200 for communicating various data, via the communication unit 116 of the interchangeable lens 100, between the lens control unit 114 and the control unit 216.

Figure 2:
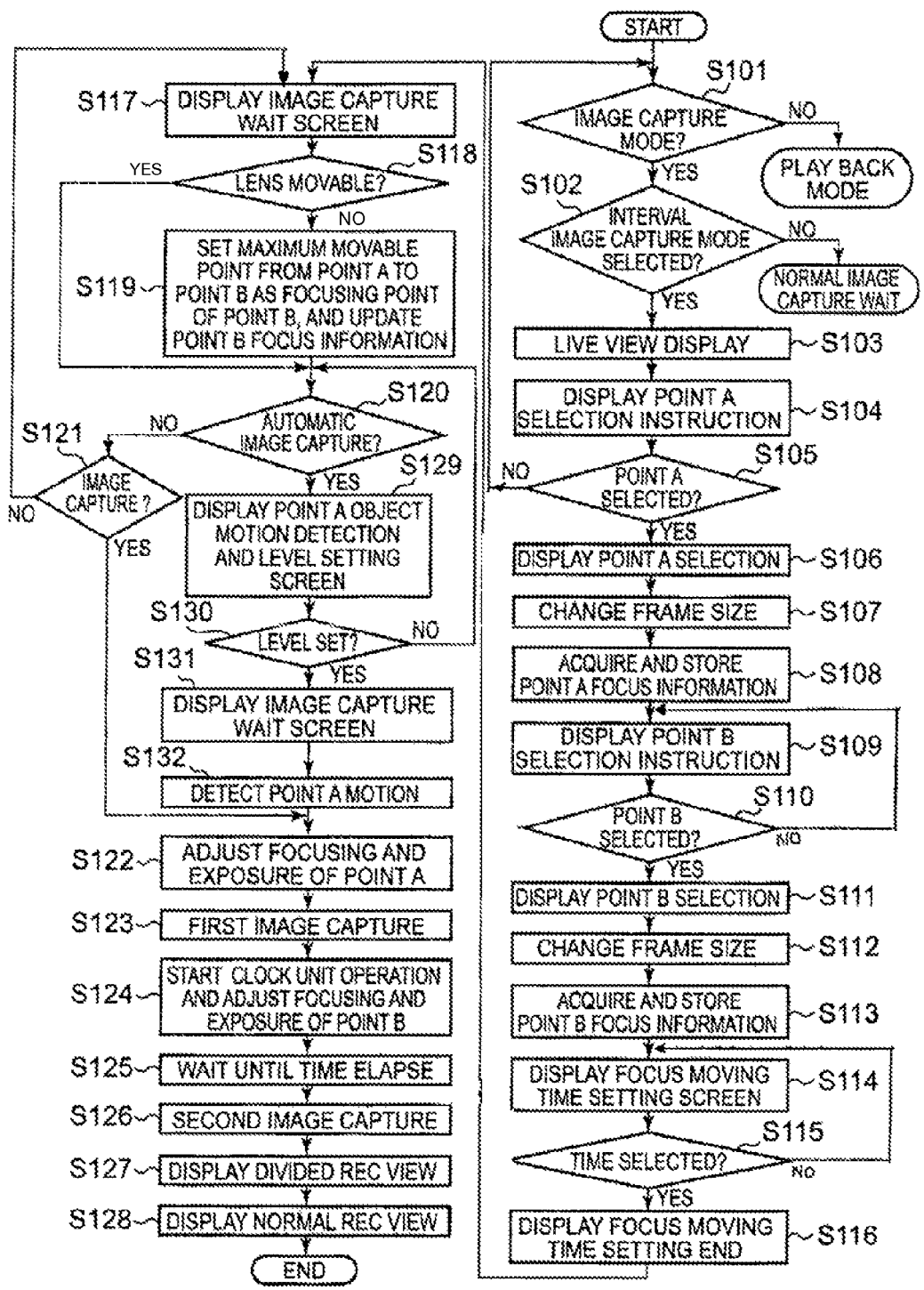
FIG. 2 is a flowchart showing an operation of an image capture apparatus according to a first embodiment of the present invention.

The following describes the operation of the image capture apparatus according to a first embodiment, with reference to FIGS. 2 to 4(e). FIG. 2 is a flowchart showing the operation of the image capture apparatus 1 according to the first embodiment. FIGS. 3(a)-3(l) and 4(a)-4(e) are diagrams showing transitions of display screens displayed by the display unit 208 in accordance with the operation shown in FIG. 2. The operation shown in FIG. 2 is primarily performed by the control unit 216. It is assumed that, upon interval image capture described later, the user holds the image capture apparatus 1 so that a plurality of objects which the user consider as main objects are contained within an image capture screen.

For instance, the operation shown in FIG. 2 starts when the power button of the body 200 is pressed. In FIG. 2, the control unit 216 determines whether or not the operation mode of the image capture apparatus 1 is an image capture mode (step S101). In this embodiment, the operation mode of the image capture apparatus 1 includes at least the image capture mode and a play back mode. The image capture mode is a mode for obtaining an image for recording. The play back mode is a mode for displaying a previously recorded image. In this embodiment, the image capture mode includes at least a normal image capture mode and an interval image capture mode.

In the case of determining that the operation mode of the image capture apparatus 1 is the play back mode in step S101, the control unit 216 performs processing of the play back mode. The processing of the play back mode is briefly described below. In the processing of the play back mode, the control unit 216 converts a list of image files recorded in the recording unit 210 to an image data group, and has the display unit 208 display the image data group. The user selects desired image data from the image data group displayed in the list, by operating the operation unit 212 or the touch operation unit 214. In response to this selection, the control unit 216 reads a corresponding image file from the recording unit 210, and inputs coded image data recorded in the image file to the image processing unit 206. The image processing unit 206 decodes the input "coded image data". The control unit 216 inputs the decoded image data to the display unit 208, to have the display unit 208 display the image data.

In the case of determining that the operation mode of the image capture apparatus 1 is the image capture (i.e., image taking) mode in step S101, on the other hand, the control unit 216 determines whether or not the interval image capture mode is selected as the image capture mode (step S102). In order to make the determination in step S102, the control unit 216 has the display unit 208 displays an image capture mode selection screen shown in FIG. 3(*a*) as an example. The image capture mode selection screen includes a normal image capture software button 302 and an interval image capture software button 304. These software buttons are selectable by the user via the touch operation unit 214. In the case of recognizing, from the output of the touch operation unit 214, that the normal image capture button 302 is selected by the user, the control unit 216 determines that the normal image capture mode is selected as the image capture mode. In the case of recognizing, from the output of the touch operation unit 214, that the interval image capture button 304 is selected by the user, the control unit 216 determines that the interval image capture mode is selected as the image capture mode. As an alternative to software buttons, physical buttons or the like may be provided for image capture mode selection as the operation unit 212. In such an alternative, the determination in step S102 may be made not from the output of the touch operation unit 214, but rather from the output of the operation unit 212.

In the case of determining that the normal image capture mode is selected as the image capture mode in step S102, the control unit 216 enters a "wait state for normal image capture". In the wait state for normal image capture, the control unit 216 performs a live view display operation. In the live view display operation, the control unit 216 continuously operates the imaging unit 202 at a predetermined frame rate, and provides as an input to the image processing unit 206, image data sequentially obtained from the imaging unit 202 by the continuous operation. The control unit 216 then provides as an inputs to the display unit 208, the image data on which the image processing for display is performed by the image processing unit 206, to have the display unit 208 display in real time an image 306 corresponding to the image data sequentially obtained via the imaging unit 202. The user can check a composition and the like, based on the image displayed by the display unit 208 through such a live view display operation.

In the case where the shutter release button is pressed by the user in the wait state for normal image capture, the control unit 216 performs normal image capture. In the normal image capture, the control unit 216 performs focusing and/or exposure adjustment in an auto program mode (P mode), a shutter priority mode (S mode), or an aperture priority mode (A mode), so that a specific object (e.g. a closest object, a central object, an object having a face, etc.) in the image capture screen is a main object. That is, the control unit 216 drives the focusing lens 102*a* so as to focus on the main object, and also sets the aperture stop of the aperture 108 and an exposure time of the image pickup device so that an exposure value of the main object is a correct exposure value. After the focusing and the exposure adjustment, as an image capture operation, the control unit 216 operates the imaging unit 202 and has the image processing unit 206 process digital image data obtained by the imaging unit 202 to generate processed digital image data. The control unit 216 then converts the processed digital image data to an image file, and records the image file in the recording unit 210.

If, on the other hand, it is determined that the interval image capture mode is selected in step S102, the control unit 216 performs the same live view display operation as in the wait state for normal image capture (step S103). However, in the interval image capture mode, the following steps are also performed.

Figure 3:
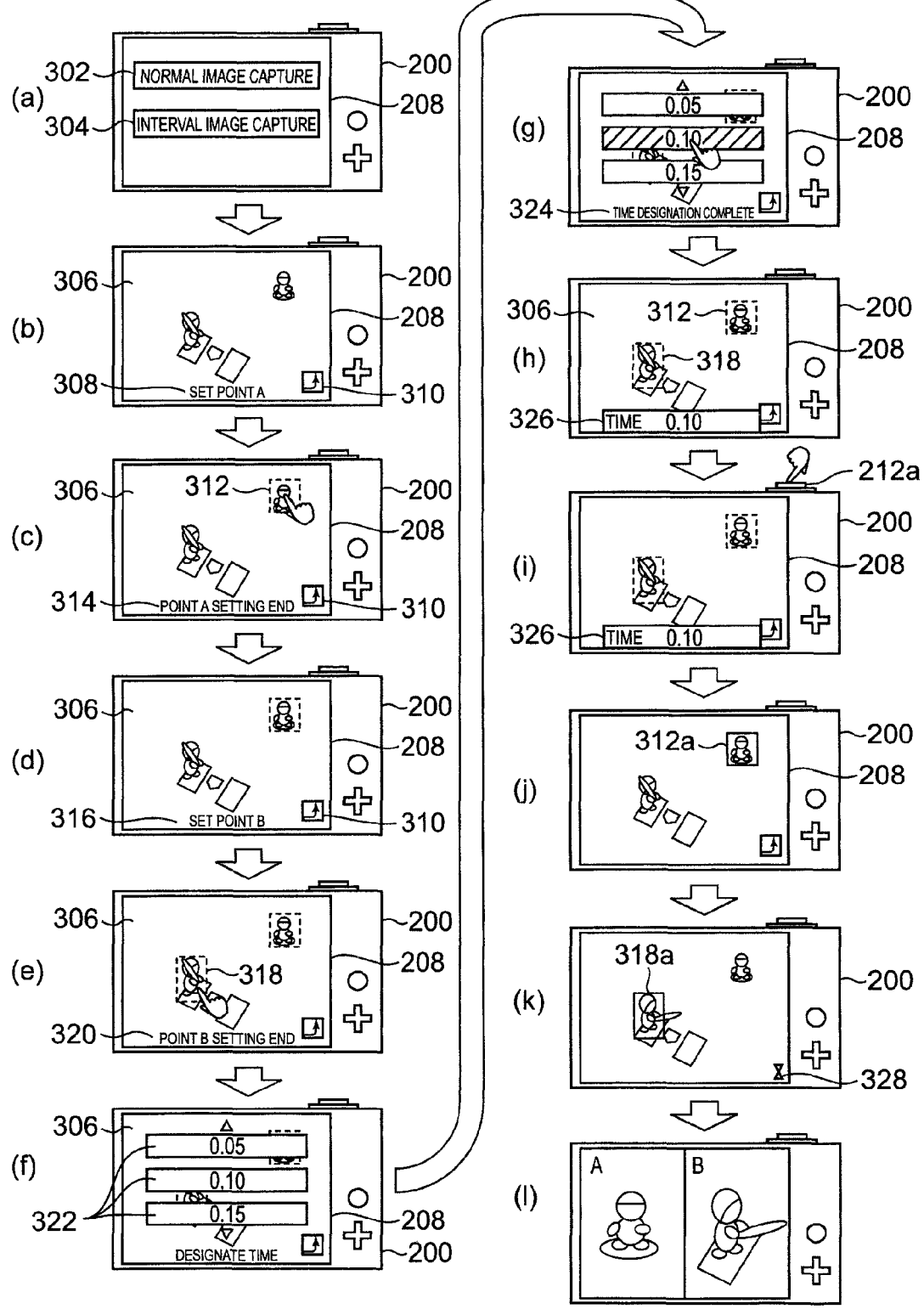
FIGS. 3(a)-3(l) are first diagrams showing transitions of display screens displayed by a display unit in accordance with the operation shown in FIG. 2.
Figure 4:
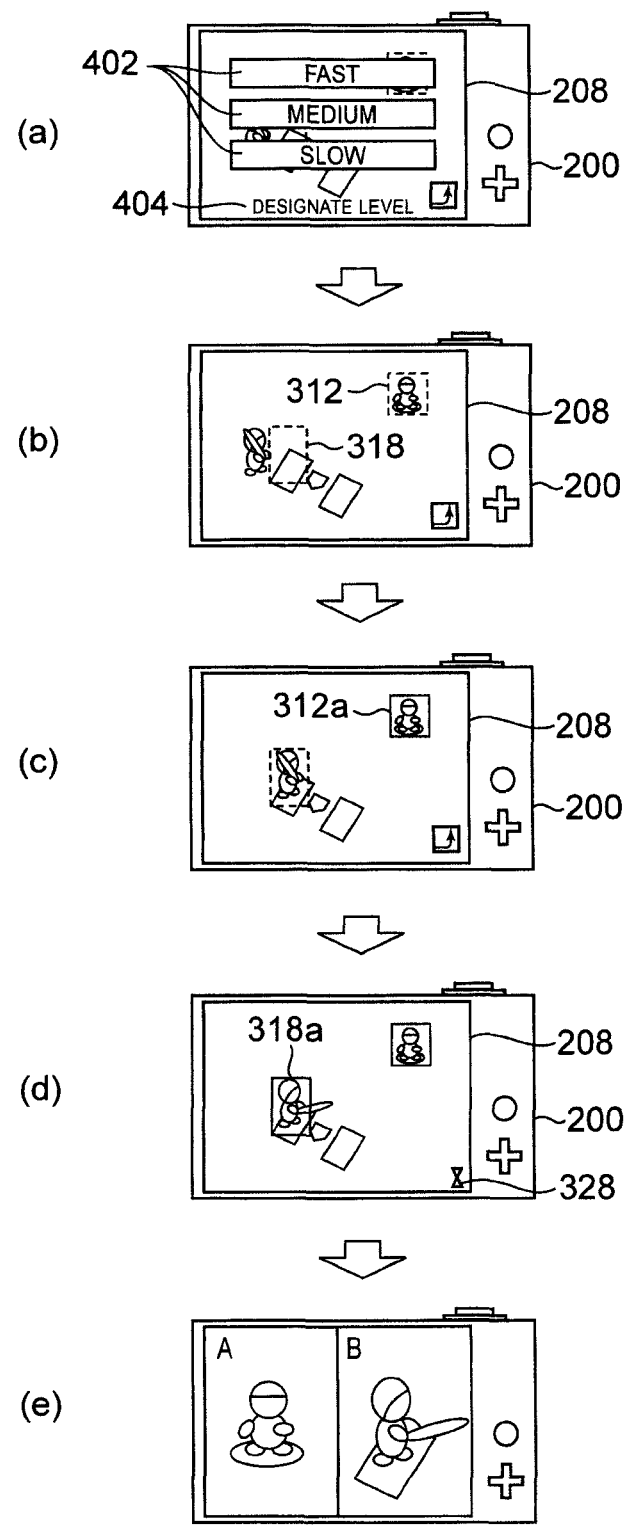
FIGS. 4(a)-4(e) are second diagrams showing transitions of display screens displayed by the display unit in accordance with the operation shown in FIG. 2.

After the live view display, the control unit 216 provides (e.g., as a translucent display) a point A selection instruction display 308 shown in FIG. 3(*b*) on the live view image 306 (step S104). The point A selection instruction display 308 prompts the user to set a position (referred to as point A) of a first object on the display screen 306. In FIG. 3(*b*), the point A selection instruction display 308 is a character (i.e., text) display. However, the point A selection instruction display 308 need not be a character display, and may be any type of display easily recognizable by the user, such as a mark. When providing (e.g., as translucent overlay) the point A selection instruction display 308, an "exit button" 310 for ending the interval image capture mode may be displayed. In the case of determining that the exit button 310 is selected during the processing shown in FIG. 2, the control unit 216 returns the processing to step S101 by an interrupt process, though its detailed description is omitted here and it is not depicted in the flowchart of FIG. 2.

After providing (e.g., as a translucent display) the point A selection instruction display 308, the control unit 216 determines whether or not point A is selected by the user, from the output of the touch operation unit 214 (step S105). When input by the user, point A defines a position of the first object. That is, point A is actually a position arbitrarily selectable by the user on the display screen. Accordingly, in step S105, the control unit 216 determines whether or not the user's finger or the like touches any position on the display screen of the display unit 208.

In the case of determining that point A is not selected (that is, that the user does not touch a point on the display screen) in step S105, the control unit 216 returns the processing to step S101. That is, the live view display in a state where the point A selection instruction display 308 is provided (e.g., as a translucent display) is continued until point A is selected (or until the image capture mode changes, or the selected interval image capture mode changes).

In the case of determining that point A is selected in step S105, the control unit 216 performs "point A selection display" shown in FIG. 3(*c*) (step S106). As the point A selection display, for example, an object area including point A is detected by the object detection unit 204, and a frame 312 enclosing the object area is displayed. At this time, an end display 314 for indicating to the user that the selection of point A is completed may be provided (e.g., as a translucent display). Though the end display 314 is a character (i.e., text) display in the example shown in FIG. 3(*c*), the end display 314 need not be a character display.

After the point A selection display, the control unit 216 changes the range of the frame 312 upon receiving the operation of the touch operation unit 214 by the user (step S107). (Alternatively, the range of the frame can remain the same.) The range of the frame 312 is determined, for example, in the case of detecting that the user's finger or the like separates from the touch operation unit 214. In step S107, the range of the frame 312 does not need to be changed in the case where there is no operation of the touch operation unit 214. In this embodiment, after the interval image capture operation, an enlarged image in the frame 312 is displayed in "display of the taken image for confirmation" (hereafter referred to as rec view). By changing the range of the frame 312, the user can set the range of point A which the user wants to confirm upon rec view display. For example, the range of the frame 312 may be automatically set so as to be a range of a circumscribed rectangle enclosing the object, in accordance with the size of the object near point A. Alternatively, the form of the frame 312 might be a shape other than a rectangle, such as a circle for example.

After changing the range of the frame 312, the control unit 216 acquires focus information of point A, and stores the acquired focus information of point A in the storage unit (step S108). The focus information of point A is information used to adjust a focusing point of the taking lens 102 to point A in image capture, described later. For instance, at step S108, the control unit 216 may execute the AF operation to adjust the focusing lens 102a to focus on point A, and store the in focus position of the focusing lens 102a in the storage unit as the focus information.

After storing the focus information of point A in the storage unit, the control unit 216 provides (e.g., as a translucent display) a point B selection instruction display 316 shown in FIG. 3(d) on the live view image 306 (step S109). The point B selection instruction display 316 prompts the user to set a position (referred to as point B) of a second object on the display screen. In FIG. 3(d), the point B selection instruction display 316 is a character (i.e., text) display. However, the point B selection instruction display 316 need not be a character display, as was the case with the point A selection instruction display 308.

After providing (e.g., as a translucent display) the point B selection instruction display 316, the control unit 216 determines whether or not point B is selected by the user, from the output of the touch operation unit 214 (step S110). Point B is the position of the second object, which is at a position on the display screen other than that of point A. Accordingly, in step S110, the control unit 216 determines whether or not the user's finger or the like touches a position on the display screen of the display unit 208 other than point A.

If it is determined that point B is not selected in step S110, the control unit 216 returns the processing to step S109. That is, the live view display in a state where the point B selection instruction display 316 is performed is continued until point B is selected.

In the case of determining that point B is selected in step S110, the control unit 216 performs "point B selection display" shown in FIG. 3(e) (step S111). As the point B selection display, a frame 318 enclosing an object area including point B is displayed, as was the case with the point A selection display. At this time, an end display 320 for indicating to the user that the selection of point B is completed may be provided (e.g., as a translucent display).

After the point B selection display, the control unit 216 changes the range of the frame 318 upon receiving the operation of the touch operation unit 214 by the user (step S112). (Alternatively, the range of the frame may remain the same.) By changing the range of the frame 318, the user can set the range of point B which the user wants to confirm upon live view display. For example, the range of the frame 318 may be automatically set so as to be a range of a circumscribed rectangle enclosing the object in accordance with the size of the object near point B.

After changing the range of the frame 318, the control unit 216 acquires focus information of point B, and stores the acquired focus information of point B in the storage unit (step S113). The focus information of point B is information used to adjust the focusing point of the taking lens 102 to point B in image capture, described later. For instance, at the timing of step S112, the control unit 216 may execute the AF operation to adjust the position of the focusing lens 102a to focus on point B, and store the position of the focusing lens 102a at the time in the storage unit as the focus information.

After storing the focus information of point B in the storage unit, the control unit 216 has the display unit 208 displays a focus moving time setting screen shown in FIG. 3(f) (step S114). The focus moving time is a time which represents an image capture interval between image capture at point A and image capture at point B. Over this time interval, the focusing lens 102a is moved from the focusing point of point A to the focusing point of point B. In the example shown in FIG. 3(f), software buttons 322 for selecting the focus moving time are displayed as the focus moving time setting screen. Though the focus moving time can be selected in a 0.05 second interval in the example shown in FIG. 3, the intervals need not be spaced at 0.05 second. Moreover, though three software buttons are simultaneously displayed in the example shown in FIG. 3, the number of software buttons is not limited to three. Furthermore, the focus moving time may be selectable via the operation unit 212.

After displaying the focus moving time setting screen, the control unit 216 determines whether or not the focus moving time is selected by the user, from the output of the touch operation unit 214 (step S115). In the case of determining that the focus moving time is not selected in step S115, the control unit 216 returns the processing to step S114. That is, the focus moving time setting screen display is continued until the focus moving time is selected.

If, on the other hand, it is determined that the focus moving time is selected in step S115, the control unit 216 provides (e.g., as a translucent display) a focus moving time setting end display 324 shown in FIG. 3(g) on the live view image 306 (step S116). The focus moving time setting end display 324 need not be a character (i.e., text) display.

After providing (e.g., as a translucent display) the focus moving time setting end display 324 on the live view image 306, the control unit 216 has the display unit 208 display an image capture wait screen shown in FIG. 3(h) (step S117). In the image capture wait screen, the frame 312 indicating point A, the frame 318 indicating point B, and a display 326 indicating the focus moving time setting result are provided (e.g., as a translucent display) on the live view image 306.

After displaying the image capture wait screen, the control unit 216 determines whether or not the focusing lens 102a can be moved from the focusing point of point A to the focusing point of point B within the focus moving time set by the user (step S118). For example, the control unit 216 may determine whether or not the result of multiplying the AF speed by the focus moving time is not less than the distance between the focusing point of point A and the focusing point of point B.

If the focusing lens 102a cannot be moved from the focusing point of point A to the focusing point of point B within the focus moving time in step S118, the control unit 216 sets a maximum movable position (i.e., a focusing point position of the focusing lens 102a closest to the focusing point of point B) within the focus moving time, as a new focusing point of point B. The control unit 216 updates the information stored in the storage unit using the new focusing point of point B as the focus information of point B (step S119). Updating the focusing point of point B in this way enables the focusing on point. B to be completed within the focus moving time, though the focusing condition of point B will be degraded.

If, on the other hand, the focusing lens 102a can be moved from the focusing point for point A to the focusing point for point B within the focus moving time in step S118, the control unit 216 skips step S119. Thus, in this case, the lens position of the focusing lens 102a after the elapse of the focus moving time can be set as the focusing point of point B.

The control unit 216 then determines whether or not to automatically execute interval image capture (step S120).

Whether or not to automatically execute interval image capture is selectable by the user, for example. A selection screen for prompting the user to select whether or not to automatically execute interval image capture may be displayed at the timing of step S120, or such selection may be performed on a menu screen of the image capture apparatus 1.

If it is determined to manually execute interval image capture in step S120, the control unit 216 determines whether or not the user instructs to start image capture (step S121). In step S121, for example, the control unit 216 determines that the user instructs to start image capture in the case where a shutter release button 212a of the operation unit 212 is pressed by the user as shown in FIG. 3(i). In the case of determining that the user does not instruct to start image capture in step S121, the control unit 216 returns the processing to step S117. That is, the control unit 216 waits in a state of maintaining the selection of point A and point B, until the user instructs to start image capture.

In the case of determining that the user instructs to start image capture in step S121, the control unit 216 controls the lens control unit 114 to adjust the lens position of the focusing lens 102a to the focusing point of point A stored in step S108, and also adjusts exposure to the object in the frame 312 including point A (step S122). An example of exposure adjustment is as follows. The control unit 216 calculates an exposure value of the entire image capture screen necessary for achieving a correct exposure value in the frame 312, from luminance generated from image data within the frame 312. The control unit 216 then determines the aperture stop of the aperture 108 and the exposure time of the image pickup device so as to attain the calculated exposure value.

After the focusing and the exposure adjustment to point A, the control unit 216 performs first image capture as shown in FIG. 3(j) (step S123). The first image capture is image capture where the object of point A is the main object, that is, an operation in which the imaging unit 202 is operated (first imaging operation) in a state where the focusing point and the exposure value are adjusted to the object of point A and image data obtained as a result is converted to an image file and recorded. The image data obtained by the first image capture is converted to the image file and recorded in the recording unit 210, as in the normal image capture. In the first image capture, a frame 312a indicating that the object which is subjected to the image capture is the object of point A may be displayed as shown in FIG. 3(j).

After the first image capture, the control unit 216 (1) starts clock unit (to time the timing interval), and (2) controls the lens control unit 114 to adjust the lens position of the focusing lens 102a to the focusing point of point B that was previously stored in step S113 (or that was previously updated in step S119), and also adjusts the exposure value to the object in the frame 318 including point B (step S124).

After the focusing and the exposure adjustment to point B, the control unit 216 waits until the focus moving time elapses (step S125). During this wait, as shown in FIG. 3(k), a mark 328 indicating to the user that the image capture apparatus 1 is in an image capture wait state may be displayed. Moreover, a frame 318a indicating that the object which is subjected to second image capture is the object of point B may be displayed as shown in FIG. 3(k).

After the elapse of the focus moving time, the control unit 216 performs a second image capture (step S126). The second image capture is image capture where the object of point B is the main object. That is, the second image capture is an operation in which the imaging unit 202 is operated in a state where the focus and the exposure are adjusted to the object of point B. The image data obtained as a result of the second image capture operation is converted to an image file and recorded. More specifically, the image data obtained by the second image capture is converted to the image file and recorded in the recording unit 210, as was the case with the image data obtained by the first image capture.

After executing the second image capture, the control unit 216 has the display unit 208 display a "divided rec view", described later (step S127). For the divided rec view, the control unit 216 inputs the image data obtained by the first image capture to the image processing unit 206, and instructs the image processing unit 206 to trim image data surrounding point A. In response, the image processing unit 206 trims the image data in the frame 312 from the input image data. (Note that the frame 312a displays the auto focus area.) The control unit 216 also inputs the image data obtained by the second image capture to the image processing unit 206, and instructs the image processing unit 206 to trim image data surrounding point B. In response, the image processing unit 206 trims the image data in the frame 318 from the input image data. After trimming the image data surrounding point A and the image data surrounding point B, the image processing unit 206 arranges and trimmed pieces of image data side by side, thereby generating divided rec view image data. The control unit 216 inputs the divided rec view image data to the display unit 208, to perform divided rec view display shown in FIG. 3(l). In the divided rec view display, the image surrounding point A and the image surrounding point B are displayed side by side, as shown in FIG. 3(l). Such a divided rec view display allows the user to simultaneously confirm, in enlarged view, the image surrounding point A and the image surrounding point B taken with the interval corresponding to the focus moving time. The divided rec view display also allows the user to simultaneously and easily confirm the focusing condition and the exposure condition about point A and the focusing condition and the exposure condition about point B.

After the divided rec view display, and responsive to an elapsed time or a user operation, the control unit 216 has the display unit 208 display a "normal rec view" (step S128). The control unit 216 then ends the processing shown in FIG. 2. Upon the normal rec view display, the control unit 216 converts either of (a) the image file in the first image capture, or (b) the image file in the second image capture, recorded in the recording unit 210, to image data, and has the display unit 208 display the image data. During the normal rec view display, the displayed image data may be switched (e.g., either automatically, or responsive to a user input) between the first image data and the second image data.

In the case of determining to automatically execute interval image capture in step S120, the control unit 216 starts detecting the point A motion by the object detection unit 204. The control unit 216 also has the display unit 208 display a screen of setting the motion level shown in FIG. 4(a) (step S129). A motion level is a threshold value for determining whether or not the object of point A has motion, and is appropriately set by the user in accordance with object motion. For example, software buttons 402 for the user to select the motion level are displayed on the motion level setting screen. Though the motion level includes three selectable stages of fast, medium, and slow in the example shown in FIG. 4(a), the selection need not be limited to three stages. Moreover, a display 404 for prompting the user to set the motion level may be displayed on the motion level setting screen.

After displaying the motion level setting screen, the control unit 216 determines whether or not the motion level is selected by the user, from the output of the touch operation unit 214 (step S130). If it is determined that that the motion level is not selected in step S130, the control unit 216 returns the processing to step S120. That is, the motion level display is continued until the motion level is selected.

If, on the other hand, it is determined that the motion level is set in step S130, the control unit 216 has the display unit 208 display an image capture wait screen shown in FIG. 4(b) (step S131). In the image capture wait screen in step S131, the frame 312 indicating point A and the frame 318 indicating point B are provided (e.g., as a translucent display) on the live view image 306, as in the image capture wait screen in step S117. Though not shown in FIG. 4(b), the display 326 indicating the focus moving time setting result may be provided (e.g., as a translucent display) on the live view image 306, too.

After displaying the image capture wait screen, the control unit 216 waits until the motion of the object of point A is detected by the object detection unit 204 (step S132). The motion of the object of point A may be detected as follows. Whether or not the motion level of the object at point A exceeds the threshold value (corresponding to the motion level selected in step S130) is determined, and the motion is detected in the case where the motion level exceeds the threshold value.

After detecting the motion of the object of point A in step S132, the control unit 216 advances the processing to step S122, to adjust the lens position of the focusing lens 102a to the focusing point of point A stored in step S108 and also adjust the exposure value to the object in the frame 312 including point A. Following this, the control unit 216 performs first image capture shown in FIG. 4(c), second image capture shown in FIG. 4(d), divided rec view display shown in FIG. 4(e), and normal rec view display in sequence, in the same way as the manual interval image capture. The control unit 216 then ends the processing shown in FIG. 2.

As described above, according to this embodiment, it is possible to perform a plurality of image capture operations in each of which a different one of a plurality of objects in the image capture screen is the main object, in the interval corresponding to the focus moving time set by the user. This enables an image of each of a plurality of mobile objects to be taken in an optimal focusing condition and exposure condition with an optimal timing. Further, according to this embodiment, whether or not the focusing lens 102a can be driven from the focusing point of point A to the focusing point of point B within the focus moving time is determined. If not, the focusing point of point B is updated. This enables the focusing on point B to be completed within the focus moving time, so that the second image capture can be performed immediately after the elapse of the focus moving time.

For example, it is assumed that an image of a baseball scene shown in FIGS. 3(a)-3(l) is taken with both a pitcher and a batter being contained within the screen. It is known that a time interval from when the pitcher throws a ball to when the batter hits the ball is about 0.2 to 0.5 second. Hence, by executing the interval image capture described in this embodiment while setting point A to the pitcher, point B to the batter, and the focus moving time to about 0.2 to 0.5 second, an image of an instant at which the pitcher throws the ball and an image of an instant at which the batter hits the ball can be each taken with an optimal focusing condition and with an optimal exposure condition.

Though FIGS. 3(a)-3(l) show an example of capture an image of a baseball scene, the technique according to this embodiment may also be applied to, for example, capture an image of a penalty kick in soccer.

In the automatic interval image capture in this embodiment, the two images are taken in response to detecting a threshold amount of motion of the object of point A. In so doing, the timing of object motion that is considered as suitable image capture timing can be captured.

Though the focus moving time can be set by the user in the example shown in FIG. 2, the focus moving time may be automatically set in accordance with the feature of the object which is subjected to image capture, such as by setting the focus moving time to about 0.2 second in the case of baseball image capture. Likewise, the threshold value for determining whether or not there is motion may be automatically set in accordance with the motion level of the object before image capture.

In the example shown in FIG. 2, if the focusing lens 102a cannot be driven from the focusing point of point A to the focusing point of point B within the focus moving time, the focusing point of point B is updated so that the lens position to which the focusing lens 102a is movable within the focus moving time and which is closest to the focusing point of point B is the new focusing point of point B. As an alternative, the focusing point of point A may be brought closer to the focusing point of point B so that the focusing lens 102a is movable within the focus moving time. As another alternative, an intermediate point between the focusing point of point A and the focusing point of point B may be set as the new focusing point of point B (or point A).

Moreover, an electrical zoom (as opposed to an optical zoom using the zoom lens) may be driven so as to enlarge the object of point A before the first image capture. Likewise, the electrical zoom may be driven so as to enlarge the object of point B before the second image capture. A zoom factor in this case may be fixed, or may be set by the user.

Figure 5:
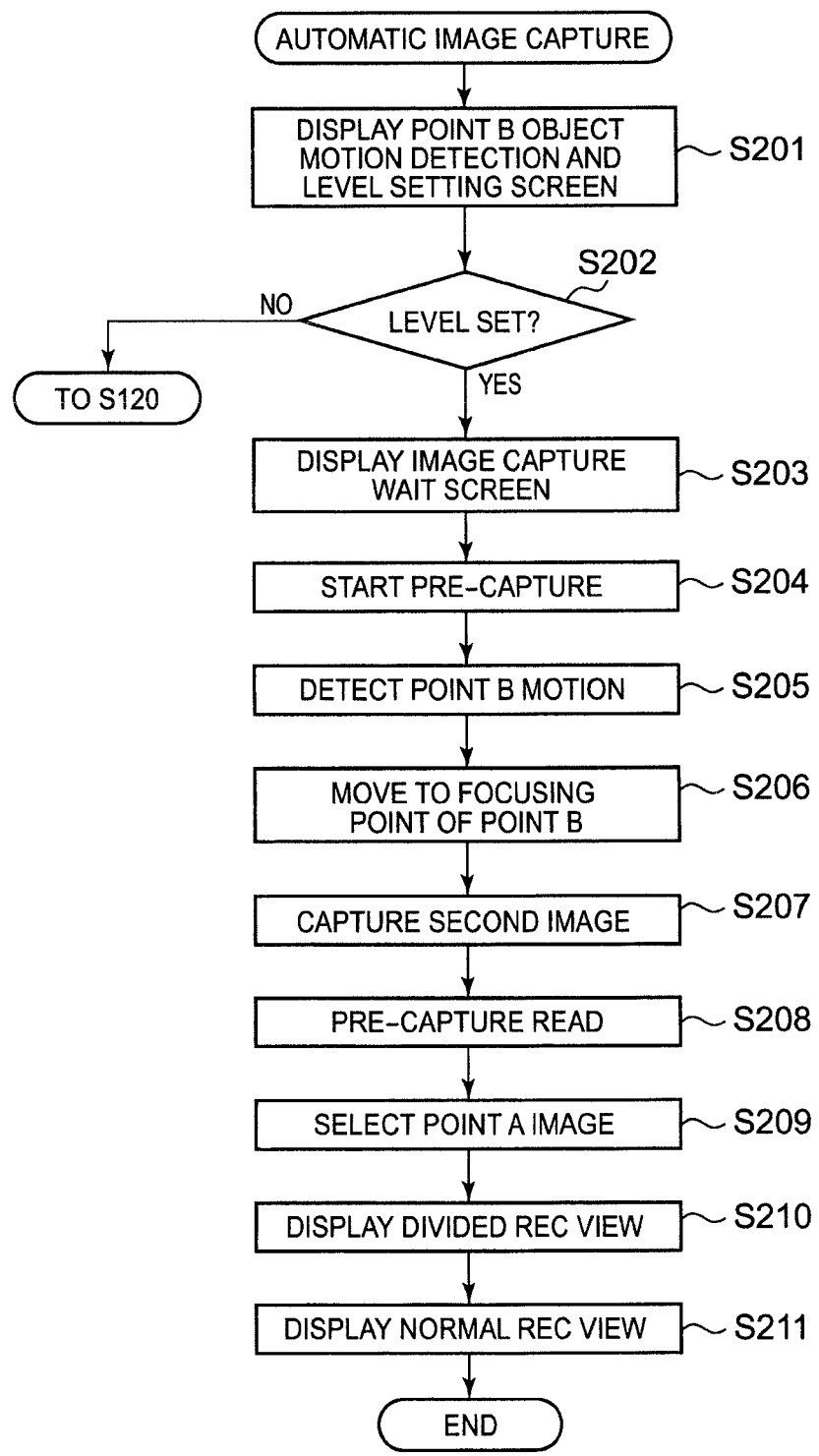
FIG. 5 is a flowchart showing an operation of an image capture apparatus according to a modification of the first embodiment of the present invention.

Though the automatic image capture is performed based on the motion of the object of point A in the example shown in FIG. 2, the automatic image capture may be performed based on the motion of the object of point B. FIG. 5 is a flowchart showing the operation in the case of performing the automatic image capture based on the motion of the object of point B. The operation in the flowchart shown in FIG. 5 is executed instead of steps S129 to S132 and S122 to S128 in FIG. 2 in the case of determining to perform the automatic image capture in step S120 in FIG. 2.

If it is determined to automatically execute interval image capture in step S120, the control unit 216 starts detecting the point B motion by the object detection unit 204. The control unit 216 also has the display unit 208 display a screen of setting the motion level (step S201). (Recall, for example, FIG. 4(a).) A motion level in step S201 is a threshold value for determining whether or not the object of point B has motion.

After displaying the motion level setting screen, the control unit 216 determines whether or not the motion level is selected by the user, from the output of the touch operation unit 214 (step S202). In the case of determining that the motion level is not selected in step S202, the control unit 216 returns the processing to step S120. That is, the motion level display is continued until the motion level is selected.

If it is determined that the motion level is set in step S202, the control unit 216 has the display unit 208 display an image capture wait screen (step S203). The control unit 216 also performs pre-capture, described later (step S204). The pre-capture operation "sequentially stores", in the storage unit, image data obtained via the imaging unit 202 as a result of live view imaging during the image capture wait screen display. During the pre-capture, a mark or the like indicating that the pre-capture is being performed may be provided (e.g., as a translucent display) on the image capture wait screen.

After starting the pre-capture, the control unit 216 waits until the motion of the object of point B is detected by the object detection unit 204 (step S205). The motion of the object of point B is detected as follows. Whether or not the motion level of the object at point B exceeds the threshold value corresponding to the motion level selected in step S202 is determined, and the motion is detected in the case where the motion level exceeds the threshold value.

After detecting the motion of the object of point B in step S205, the control unit 216 controls the lens control unit 114 to adjust the lens position of the focusing lens 102a to the focusing point of point B stored in step S113 or updated in step S119 (step S206). In step S206, the control unit 216 may also adjust the exposure value to the object of point B, and/or drive the zoom lens to enlarge the object of point B.

After the focusing on point B, the control unit 216 performs second image capture (step S207). Image data obtained by the second image capture is converted to an image file and recorded in the recording unit 210.

After executing the second image capture, the control unit 216 reads the image data acquired by the pre-capture in step S204, from the storage unit (step S208). The control unit 216 selects the image data of the object of point A, from the read image data (step S209). For example, the control unit 216 selects image data with focus or exposure most accurately adjusted to point A. The image data may instead be selected by the user. Thus, in this modification, the control unit 216 also functions as a selection unit. After selecting the image data of the object of point A, the control unit 216 has the display unit 208 display a divided rec view (step S210). After displaying the divided rec view, the control unit 216 has the display unit 208 display a normal rec view (step S211). The control unit 216 then ends the processing shown in FIG. 5.

According to the processing shown in FIG. 5 described above, the interval image capture that puts more importance on the image capture timing at the start of motion of the object of point B than motion of the object of point A can be realized.

Second Embodiment

The following describes a second embodiment of the present invention. In the second embodiment, taking photos and recording movies are combined so that an image of a more optimal image capture timing can be obtained for the object of point A and the object of point B.

Figure 6:
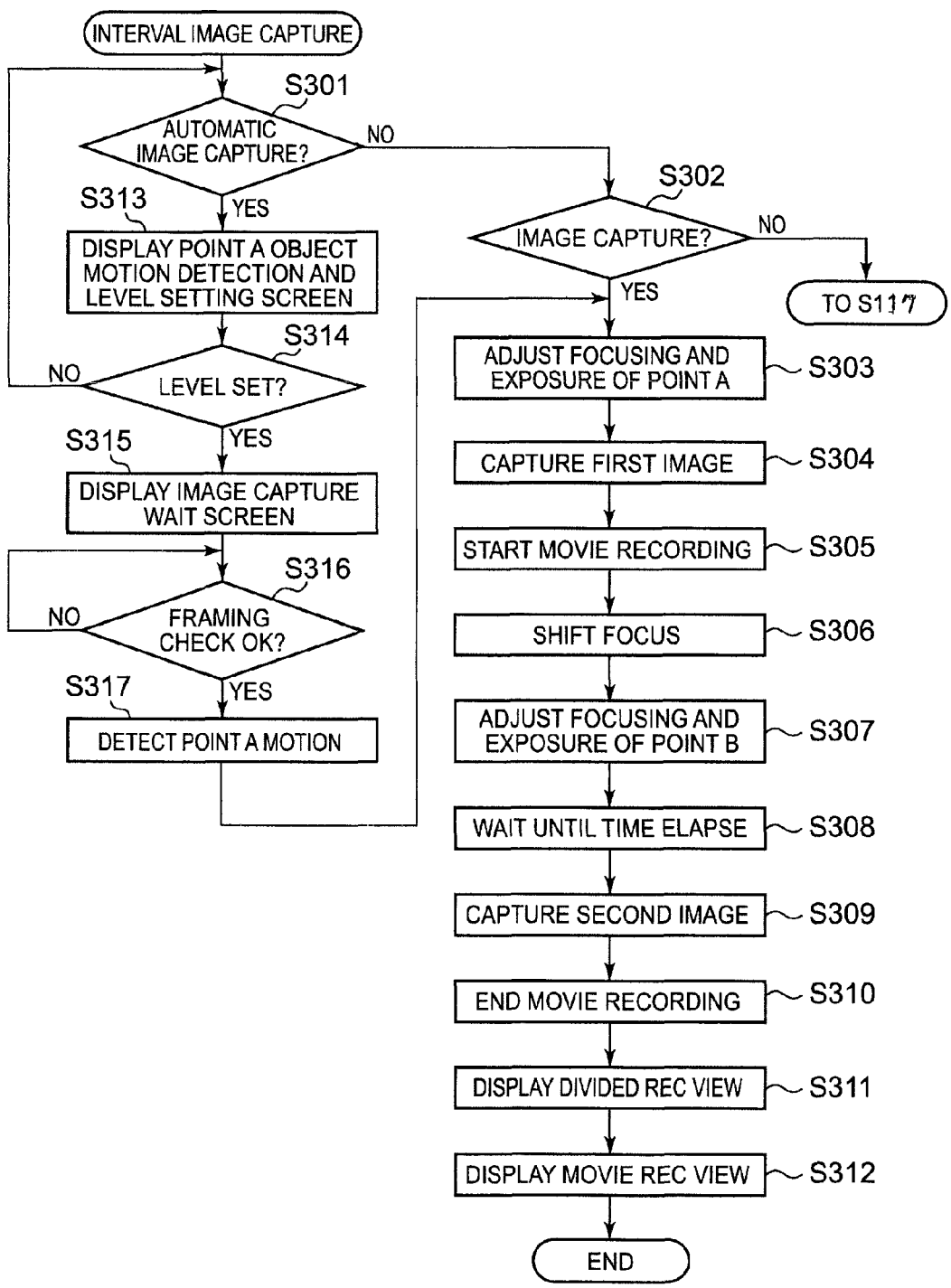
FIG. 6 is a flowchart showing an operation of an image capture apparatus according to a second embodiment of the present invention.

FIG. 6 is a flowchart showing an interval image capture operation in the second embodiment. The operation in the flowchart shown in FIG. 6 is executed instead of the processing from step S120 onward in FIG. 2. In FIG. 6, the control unit 216 determines whether or not to automatically execute interval image capture (step S301). Whether or not to automatically execute interval image capture can be determined in the same way as described above with reference to step S120 of FIG. 2.

If it is determined to manually execute interval image capture in step S301, the control unit 216 determines whether or not the user instructs to start image capture (step S302). In the case of determining that the user does not instruct to start image capture in step S302, the control unit 216 returns the processing to step S117. That is, the control unit 216 waits in a state of maintaining the selection of point A and point B, until the user instructs to start image capture.

In the case of determining that the user instructs to start image capture in step S302, the control unit 216 controls the lens control unit 114 to adjust the lens position of the focusing lens 102a to the focusing point of point A previous stored in step S108, and also adjusts the exposure value to the object in the frame 312 including point A (step S303).

After the focusing and the exposure adjustment to point A, the control unit 216 performs first image capture (step S304). The first image capture S304 is performed in the same way as in step S123 in FIG. 2.

After the first image capture, the control unit 216 starts movie recording (step S305). In detail, the control unit 216 continuously operates the image pickup device, and stores image data sequentially obtained by the imaging unit 202 through the continuous operation in the storage unit. After the start of the movie recording, the control unit 216 controls the lens control unit 114 to gradually shift the lens position of the focusing lens 102a in a "focusing point direction" of point B (step S306). When the lens position of the focusing lens 102a reaches point B, the control unit 216 adjusts the exposure value to the object in the frame 318 including point B (step S307). Here, a lens moving speed when moving the lens position of the focusing lens 102a from point A to point B is set in accordance with the focus moving time. That is, the moving speed is set so that the lens position of the focusing lens 102a reaches the focusing point of point B by the time the focus moving time elapses.

After the focusing and the exposure adjustment to point B, the control unit 216 waits until the focus moving time elapses, if the focus moving time has not elapsed yet (step S308). Responsive to the elapse of the focus moving time, the control unit 216 performs second image capture (step S309). The second image capture is performed in the same way as in step S126 in FIG. 2.

After executing the second image capture, the control unit 216 ends the movie recording (step S310). Upon ending the movie recording, the control unit 216 processes the series of image data stored in the storage unit by the image processing unit 206, and records the processed image data in the recording unit 210 as one movie file.

After the movie recording ends, the control unit 216 has the display unit 208 display a divided rec view (step S311). The display of the divided rec view is performed in the same way as in step S127 in FIG. 2.

After the divided rec view display and responsive to either an elapsed time or a user operation, the control unit 216 has the display unit 208 display a "movie rec view" (step S312). The control unit 216 then ends the processing shown in FIG. 6. In the movie rec view display, the control unit 216 converts the movie file recorded in the recording unit 210 to movie data, and has the display unit 208 display the movie data. When a touch on point A or point B is detected during the movie rec view display, a normal rec view of a photo where the object of the touched point is the main object may be displayed.

If, on the other hand, it is determined to automatically execute interval image capture in step S301, the control unit 216 starts detecting the point A motion by the object detection unit 204. The control unit 216 also has the display unit 208 display a screen of setting the motion level (step S313).

After displaying the motion level setting screen, the control unit 216 determines whether or not the motion level is selected by the user, from the output of the touch operation unit 214 (step S314). If it is determined that the motion level is not selected in step S314, the control unit 216 returns the processing to step S301. That is, the motion level setting screen display is continued until the motion level is selected.

If, on the other hand, it is determined that the motion level is set in step S314, the control unit 216 has the display unit 208 display an image capture wait screen (step S315).

After displaying the image capture wait screen, the control unit 216 checks a composition, and determines whether or not the check result is OK (step S316). In the composition check, the control unit 216 checks whether or not the objects exist, respectively, in the frames 312 and 318, and determines that the check result is OK in the case where the objects exist in both of the frames. In the case of determining that the check result is not OK in step S316, the control unit 216 waits while repeatedly performing the determination in step S316. That is, the image capture wait screen display is continued until the check result is OK. The composition check may also be performed after step S131 in FIG. 2 or after step S203 in FIG. 5.

In the case of determining that the check result is OK in step S316, the control unit 216 waits until the motion of the object of point A is detected by the object detection unit 204 (step S317).

After detecting the motion of the object of point A in step S317, the control unit 216 advances the processing to step S303, and the control unit 216 executes the same processing as in the manual interval image capture. The control unit 216 then ends the processing shown in FIG. 6.

As described above, according to this second embodiment, it is possible to perform a plurality of image capture operations, in each of which, a different one of a plurality of objects in the image capture screen is the main object, in the interval corresponding to the focus moving time set by the user. This enables an image of each of a plurality of mobile objects to be taken in an optimal focusing condition and exposure condition with an optimal timing.

Further, according to this second embodiment, the movie recording is performed after the first image capture. Therefore, even if the second image obtained after the elapse of the focus moving time is not an image of a timing desired by the user, or not an image of a focusing condition desired by the user, there is still a possibility that an image desired by the user can be obtained from images obtained by the movie recording.

Though the present invention has been described above by way of the embodiments, the present invention is not limited to the above-described embodiments, and various modifications and applications are possible within the scope of the present invention. For example, though each of the above-described embodiments uses an example of capture images of two objects existing at two points in the image capture screen, the techniques according to the foregoing embodiments are also applicable to capture images of objects existing at three or more points in the image capture screen. In such a case, the user may designate a plurality of positions in the image capture screen, and set a focus moving time after capture an image of an object at each position. For example, by applying the technique according to the embodiment to image capture of three or more points in this way, each scene of a footrace, namely, the start, the final corner, and the finish line can be captured. Though the operation is described using the terms such as "first" and "then" in each of the above-described operation flowcharts for convenience's sake, the operation need not be performed in the stated order.

Furthermore, portions of the above-described embodiments, perhaps combined, may themselves constitute an invention.

What is claimed is:

1. An image capture apparatus comprising:
an optical unit configured to direct light from an object to generate an object image;
an imaging unit configured to obtain image data from the object image;
a user operation input unit configured to provide both an object specifying unit configured to designate a first object in the image data responsive to a first user input and to designate a second object in the image data responsive to a second user input, and
a time setting unit configured to set, based on a third user input, an image capture time interval between the first object and the second object;
a shutter release unit configured to invoke an image capture operation by the imaging unit; and
an imaging control unit configured to
1) perform, responsive to the invocation of the image capture operation by the shutter release unit, a first image capture operation in which a focusing point of the optical unit is set to a first focusing point corresponding to the first object and in which an exposure value of the imaging unit is set to an exposure value appropriate for the first object, and
2) perform, responsive to the elapse of the image capture time interval following the first image capture operation, a second image capture operation in which the focusing point of the optical unit is set to a second focusing point corresponding to the second object and in which the exposure value of the imaging unit is set to an exposure value appropriate for the second object,
3) determine whether or not it is possible to change the focusing point of the optical unit from the first focusing point to the second focusing point within the image capture time interval, and
4) responsive to a determination that it is not possible to change the focusing point of the optical unit from the first focusing point to the second focusing point within the image capture time interval, causes the focusing point of the optical unit during the second image capture operation to be set to a focusing point which can be reached within the image capture time interval and which is closest to the second focusing point.

2. An image capture apparatus comprising:
an optical unit configured to direct light from an object to generate an object image;
an imaging unit configured to obtain image data from the object image;
a user operation input unit configured to provide both an object specifying unit configured to designate a first object in the image data responsive to a first user input and to designate a second object in the image data responsive to a second user input, and
a time setting unit configured to set, based on a third user input, an image capture time interval between the first object and the second object;
a shutter release unit configured to invoke an image capture operation by the imaging unit; and
an imaging control unit configured to
1) perform, responsive to the invocation of the image capture operation by the shutter release unit, a first image capture operation in which a focusing point of the optical unit is set to a first focusing point corresponding to the first object and in which an exposure value of the imaging unit is set to an exposure value appropriate for the first object, and
2) perform, responsive to an elapse of the image capture time interval following the first image capture operation, a second image capture operation in which the focusing point of the optical unit is set to a second focusing point corresponding to the second object and in which the exposure value of the imaging unit is set to an exposure value appropriate for the second object 3) determines whether or not the focusing point of the optical unit is changeable from the first focusing point to the second focusing point within the image capture time interval, and 4) in a case where the focusing point of the optical unit is not changeable, causes the focusing point of the optical unit during the second image capture operation to be adjusted to an intermediate focusing point between the first focusing point and the second focusing point.

3. The image capture apparatus according to claim 1, further comprising an object detection unit for detecting motion of the first object, wherein the imaging control unit executes the first imaging responsive to a determination that a detected motion of the first object exceeds a threshold.

4. An image capture apparatus comprising:

an optical unit for imaging light from an object to generate an object image;

an imaging unit for obtaining image data from the object image;

a user operation input unit configured to provide both an object specifying unit for designating each of a first object and a second object in the image data, and a time setting unit for setting an image capture time interval between the first object and the second object;

an object detection unit for detecting motion of the second object;

an imaging control unit for: obtaining movie data by continuously operating the imaging unit after the setting;

executing second still imaging when the motion of the second object is detected; and a selection unit for selecting still image data of the first object from the movie data.

5. A control method for use with an image capture apparatus including an optical unit configured to direct light from an object onto an imaging unit configured to obtain image data from the directed light, and a user input unit configured to accept user touch input and to provide at least one of (a) a position on the image data corresponding to the accepted user touch input, or (b) a selection corresponding to the accepted user touch input, the control method comprising:

a) receiving from the user input unit,
  i) a first position on the image data corresponding to a first user touch input,
  ii) a second position on the image data corresponding to a second user touch input, and
  iii) an interval time selection corresponding to a third user touch input, b) determining a first focus position for the optical unit to focus a first object of the image data at the first position, c) determining a second focus position for the optical unit to focus a second object of the image data at the second position if it is possible for the optical unit to obtain the second focus position, otherwise, determining a second focus position for the optical unit to focus between the first object and the second object, d) setting the optical unit to the first focus position, e) determining first exposure parameters for a desired exposure of the first object, f) performing a first image capture using the first exposure parameters, g) setting the optical unit to the second focus position, h) determining second exposure parameters for a desired exposure of the second object, i) performing, at an expiration of the selected interval time from the first image capture, a second image capture using the second exposure parameters, j) determining whether or not it is possible to change the focusing position of the optical unit from the first focusing position to the second focusing position within the selected interval time, and k) responsive to a determination that it is not possible to change the focusing position of the optical unit from the first focusing position to the second focusing position within the selected interval time, causing the focusing position of the optical unit during the second image capture to be set to a focusing position which can be reached within the selected interval time and which is closest to the second focusing position.

6. A control method for use with an image capture apparatus including an optical unit configured to direct light from an object onto an imaging unit configured to obtain image data from the directed light, and a user input unit configured to accept user touch input and to provide at least one of (a) a position on the image data corresponding to the accepted user touch input, or (b) a selection corresponding to the accepted user touch input,— the control method comprising:

a) receiving from the user input unit,
  i) a first position on the image data corresponding to a first user touch input,
  ii) a second position on the image data corresponding to a second user touch input, and
  iii) an interval time selection corresponding to a third user touch input, b) determining a first focus position for the optical unit to focus a first object of the image data at the first position, c) determining a second focus position for the optical unit to focus a second object of the image data at the second position if it is possible for the optical unit to obtain the second focus position, otherwise, determining a second focus position for the optical unit to focus between the first object and the second object, d) setting the optical unit to the first focus position, e) determining first exposure parameters for a desired exposure of the first object, f) performing a first image capture using the first exposure parameters, g) setting the optical unit to the second focus position, h) determining second exposure parameters for a desired exposure of the second object, i) performing, at an expiration of the selected interval time from the first image capture, a second image capture using the second exposure parameters j) determining whether or not the focusing position of the optical unit is changeable from the first focusing position to the second focusing position within the selected interval time, and k) responsive to a determination that the focusing position of the optical unit is not changeable, causes the focusing position of the optical unit during the second imaging to be adjusted to an intermediate focusing position between the first focusing position and the second focusing position.

* * * * *